United States Patent
Fourney

(10) Patent No.: US 9,352,908 B1
(45) Date of Patent: May 31, 2016

(54) STACKED-ROLLER BELT CONVEYOR WITH ZONE CONTROL

(71) Applicant: Laitram, L.L.C., Harahan, LA (US)

(72) Inventor: Matthew L. Fourney, Laurel, MD (US)

(73) Assignee: Laitram, L.L.C., Harahan, LA (US)

(*) Notice: Subject to any disclaimer, the term of this patent is extended or adjusted under 35 U.S.C. 154(b) by 0 days.

(21) Appl. No.: 14/559,704

(22) Filed: Dec. 3, 2014

(51) Int. Cl.
B65G 17/20 (2006.01)
B65G 39/20 (2006.01)
B65G 17/08 (2006.01)
B65G 17/24 (2006.01)

(52) U.S. Cl.
CPC .............. B65G 17/083 (2013.01); B65G 17/24 (2013.01); B65G 39/20 (2013.01)

(58) Field of Classification Search
CPC .................. B65G 17/24; B65G 39/20; B65G 2812/02841
USPC ........................................................ 198/779
See application file for complete search history.

(56) References Cited

U.S. PATENT DOCUMENTS

| 1,852,942 | A | * | 4/1932 | Streine | B65G 17/061 |
| | | | | | 198/779 |
| 3,040,379 | A | * | 6/1962 | Bayer | B29C 53/24 |
| | | | | | 198/626.1 |
| 4,293,064 | A | * | 10/1981 | Robinson | B65G 13/00 |
| | | | | | 198/779 |
| 5,186,336 | A | | 2/1993 | Pippin et al. | |
| 6,694,220 | B1 | | 2/2004 | Tanz | |
| 7,588,137 | B2 | | 9/2009 | Fourney | |
| 7,878,319 | B2 | | 2/2011 | Costanzo et al. | |

(Continued)

FOREIGN PATENT DOCUMENTS

JP 57046513 U 3/1982
JP 58191115 U 12/1983

(Continued)

OTHER PUBLICATIONS

International Search Report and Written Opinion of the International Searching Authority, PCT/US2015/059960, mailed Feb. 22, 2016, Korean Intellectual Property Office, Republic of Korea.

Primary Examiner — Mark A Deuble
(74) Attorney, Agent, or Firm — James T. Cronvich

(57) ABSTRACT

A zone-controlled in-line, stacked-roller conveyor belt. The belt has pairs of stacked rollers—a top article-supporting roller and a bottom driven roller. The top and bottom rollers contact each other so that when the bottom roller is driven in one direction by contact with a bearing surface under the belt as the belt advances, the top roller rotates in the opposite direction—opposite to the direction of belt travel. Articles atop the actuated roller pairs mark time. When the bottom roller is out of contact with a bearing surface, the rollers are braked and do not rotate so that the articles atop the braked rollers advance with the belt. The bearing surfaces are arranged in individually controllable segments that are dynamically grouped into zones that are actuated to halt an article in that zone. An imaging system is used by a controller to change the zone grouping dynamically.

15 Claims, 3 Drawing Sheets

(56) References Cited

U.S. PATENT DOCUMENTS

| | | |
|---|---|---|
| 8,424,675 B2 | 4/2013 | Rau |
| 8,678,180 B2 * | 3/2014 | Marshall ............... B65G 17/24 198/779 |
| 2004/0104100 A1 | 6/2004 | Schiesser et al. |
| 2006/0249355 A1 | 11/2006 | Costanzo et al. |
| 2008/0251359 A1 | 10/2008 | Fourney |
| 2010/0065401 A1 | 3/2010 | Dowe |
| 2010/0065403 A1 * | 3/2010 | Fourney ............... B65G 47/22 198/779 |
| 2010/0200365 A1 | 8/2010 | Pressler et al. |
| 2011/0022221 A1 | 1/2011 | Fourney |
| 2012/0285799 A1 * | 11/2012 | Fourney ............... B65G 47/28 198/459.6 |
| 2014/0054137 A1 | 2/2014 | Fourney |
| 2014/0069776 A1 * | 3/2014 | Fourney ............... B65G 17/24 198/606 |
| 2014/0090961 A1 * | 4/2014 | Costanzo ............... B65G 47/53 198/779 |

FOREIGN PATENT DOCUMENTS

| | | |
|---|---|---|
| JP | 60252509 A | 12/1985 |
| JP | 27218 U | 1/1990 |

* cited by examiner

STACKED-ROLLER BELT CONVEYOR WITH ZONE CONTROL

BACKGROUND

The invention relates generally to power-driven conveyors and more particularly to belt conveyors with stacked rollers.

In many conveying applications it is necessary to convert a mass flow of articles into a single file. For example, some processing devices can operate on only one article at a time. In those cases, the articles must be singulated before reaching the devices. And as another example, the sorting of singulated articles on a conveyor is simpler if the articles are in a single file rather than side by side.

SUMMARY

One version of a conveyor belt embodying features of the invention comprises multiple roller sets each including a top roller and a bottom roller. The top roller at the top side of the conveyor belt supports conveyed articles. The bottom roller at the bottom side of the belt contacts the top roller such that rotation of the bottom roller in a first direction causes rotation of the top roller in an opposite second direction. The roller sets are translated along channels in the conveyor belt from a first position to a second position. In the first position the top roller extends to a maximum level above the top side. In the second position the top roller extends to a minimum level below the maximum level.

One version of a conveyor usable with such a conveyor belt comprises an array of independently actuated segments under the bottom side of the conveyor belt. Each segment includes a bearing surface selectively movable into and out of contact with the bottom rollers. The roller sets are moved into the first position with the bottom rollers rotating on the bearing surface when the bearing surface is moved into contact with the bottom rollers. The roller sets are moved into the second position when the bearing surface is out of contact with the bottom rollers.

In another aspect of the invention, a method for conveying articles comprises:
(a) supporting articles atop sets of vertically stacked top and bottom rollers in a conveyor belt advancing in a direction of belt travel; (b) forming a carryway for the conveyor belt with an array of individually actuatable bearing surface segments under the conveyor belt;
(c) selectively actuating bearing surface segments to move into a first position in contact with bottom rollers to raise the top rollers to a maximum level above the top of the conveyor belt and to rotate the top rollers in a direction opposite to the direction of belt travel so that articles atop the rotating top rollers mark time; (d) selectively deactuating bearing surface segments to move into a second position out of contact with the bottom rollers to the top rollers to be lowered to a minimum level below the maximum level; and (e) frictionally braking deactuated top rollers so that articles atop the braked top rollers advance in the direction of belt travel with the conveyor belt.

DETAILED DESCRIPTION

Figure 1:
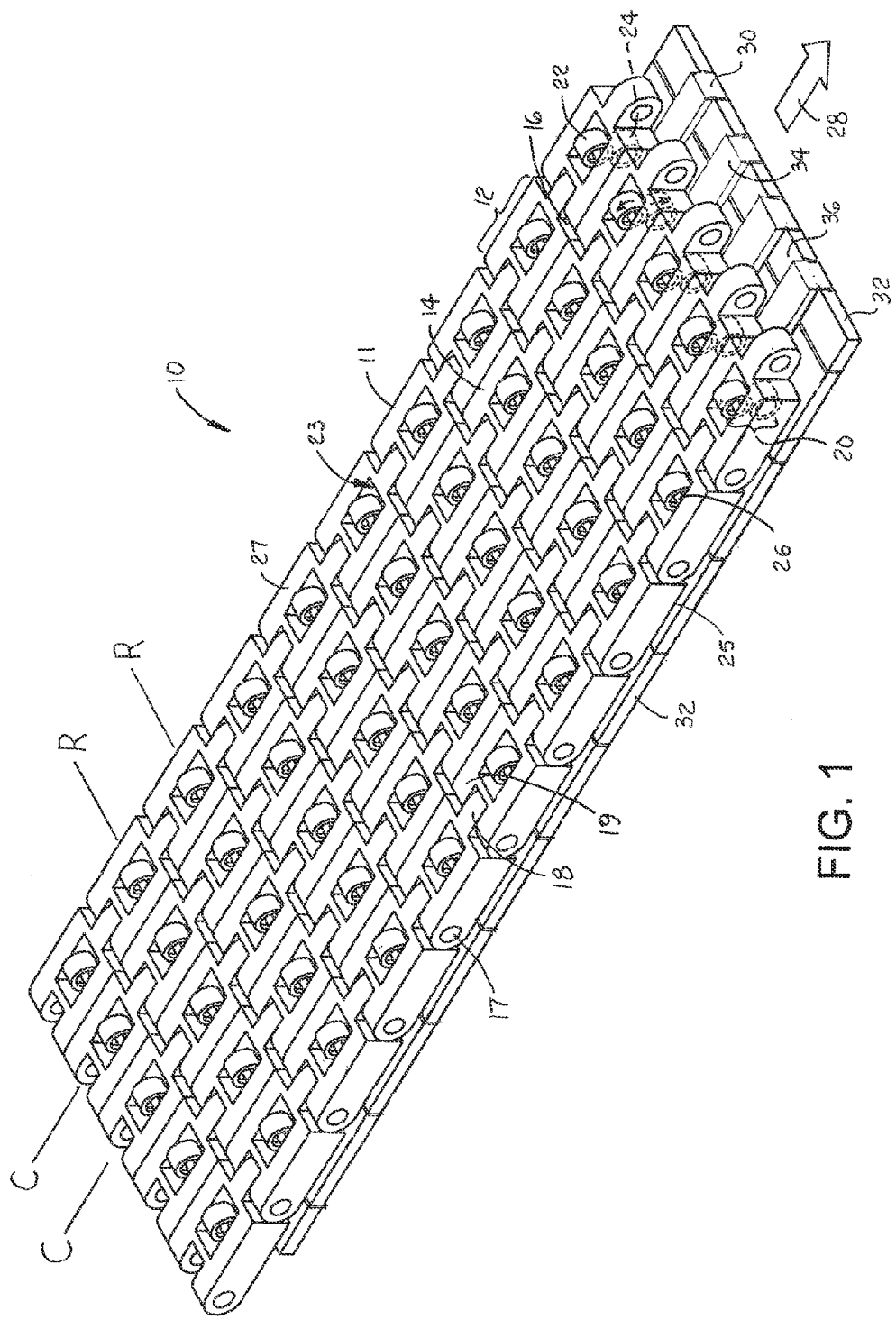
FIG. 1 is an isometric view of a portion of the carryway of a conveyor embodying features of the invention.

A portion of the carryway of a conveyor system embodying features of the invention is shown in FIG. 1. The conveyor system 10 includes a modular conveyor belt 11 constructed of a series of rows 12 of one or more belt modules 14. The rows are linked together at hinge joints 16 formed by hinge rods 17 linking interleaved hinge elements 18, 19 of adjacent rows. The conveyor belt 11 is a dual-roller conveyor belt that includes an array of roller sets 20 including a top roller 22 and a bottom roller 24 arranged in a vertical stack in a cavity 23 extending from a bottom side 25 of the belt to a top side 27. The peripheries of the top and bottom rollers in each set, or stack, are in contact so that rotation of the bottom roller in one direction causes rotation of the top roller in the opposite direction. Both the top and bottom rollers in this example are cylindrical rollers mounted on, or integrally formed with, axles 26. Because the axles 26 are oriented perpendicular to the direction of belt travel 28, the rollers rotate in a direction parallel to the direction of belt travel. Rollers in this orientation are referred to as in-line rollers because they rotate in line with the direction of belt travel 26. The roller sets could alternatively be formed instead with a spherical roller without an axle in place of the top roller or the bottom roller. Or each roller set could comprise two top rollers contacting a single bottom roller, or one top roller contacting a pair of bottom rollers. The bottom rollers 24 extend down from the cavity 23 at the bottom side 25 of the belt. The top rollers 22 extend up from the cavity at the top side 27. Alternatively, the top roller could be supported entirely above the top side, and not in the cavity, with the bottom roller then extending past both the bottom and the top sides. The roller sets 20 are arranged in lateral rows R and longitudinal columns C across the width and along the length of the belt 11.

Figure 3:
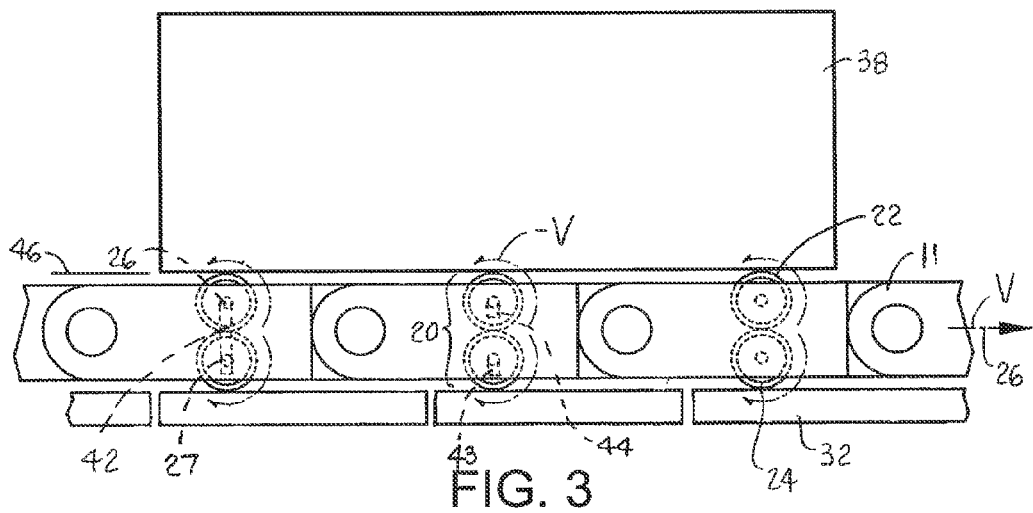
FIG. 3 is a side elevation view of the conveyor of FIG. 1.

The conveyor carryway includes stationary wearstrips 30 positioned under the top run of the belt 11 between the columns C of rollers. The remainder of the carryway is divided into independently controllable bearing surface segments 32 arrayed to form a grid. Each of the segments is sized, in this example, to actuate a single roller set 20. But each segment could be larger to actuate multiple contiguous roller sets. The segments 32 actuate roller sets 20 by moving into position to contact the bottom rollers 24 as they pass by. In this example that would mean raising the segments 32 from the positions shown to a level above the top bearing surfaces 34 of the wearstrips 30. As the conveyor belt 11 advances in the direction of belt travel 28, the bottom rollers 24 roll on the raised segment's top bearing surface 36. The direction of rotation of each of the bottom rollers at its top tangent is parallel to the direction of belt travel 28. With no slip, the tangential speed of the bottom roller at its top equals the belt speed. The rolling contact of the bottom roller 24 with the top roller 22 causes the top roller to rotate in the opposite direction. The tangential speed of the actuated top roller 22 is equal to the belt speed, but in the opposite direction. So an article atop one or more actuated roller sets 20 appears to mark time—stationary to a stationary observer. This is also shown in FIG. 3. If the belt travels to the right at a velocity V, the actuated top rollers 22 have a tangential velocity of −V at the top. And the absolute velocity of an article 38 atop the actuated roller sets 20 is zero.

Figure 2:
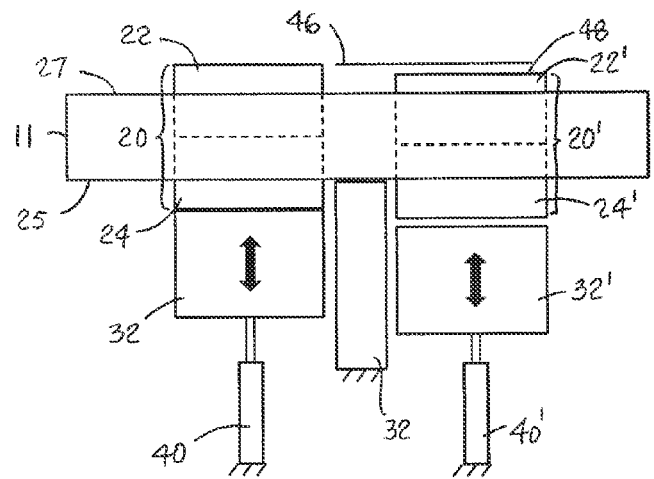
FIG. 2 is a front elevation view of a portion of the conveyor of FIG. 1.

One scheme for actuating the roller sets 20 is shown in FIG. 2. The roller set 20 on the left is shown actuated. The segment 32 is raised into an actuating position by an actuator 40, such as the pneumatic or hydraulic cylinder shown, or by cams, motors, magnetics, or springs, or combinations of those, for example. In the actuating position, the segment 32 provides a bearing surface 36 on which the bottom roller 24 rolls as the belt advances in the direction of belt travel. FIG. 3 also shows segments 32 in the actuating position in contact with the bottom rollers 24. The segment 32' on the right in FIG. 2 is shown lowered by the actuator 40' to a deactuating position out of contact with the bottom roller 24'. Forward motion of the belt 11 does not impart any rotation to the deactuated rollers 24', 22' in the roller set 20'.

Figure 4:
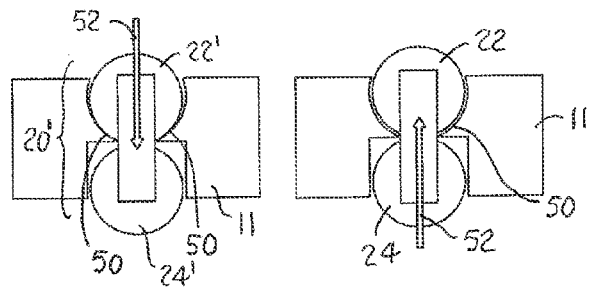
FIG. 4 is a side elevation view of the interior of a conveyor belt usable in a conveyor as in FIG. 1.

As shown in FIG. 3, the axles 26, 27 of the top and bottom rollers 22, 24 are retained in a long vertical channel 42 at each end. Or they are retained in a pair of shorter vertical channels 43, 44 at each end. The vertical channels allow the roller sets 20 to move up, when actuated by the segments 24, to an upper, maximum level 46 shown in FIG. 3 and on the left in FIG. 2 and to move down to a lower, minimum level 48 shown on the right in FIG. 2. In addition, as shown in FIG. 4, the deactuated and lowered roller set 40' on the left is frictionally braked because the top roller 22' is seated on a surface 50 in the belt 11 that acts as a brake pad to the roller set 20'. The bottom roller 24', out of contact with the lowered underlying segment, is braked by the braked top roller 22'. The weight of an article atop the deactuated roller set 20' pushes the top roller 22' downward 52 against the braking surface 50. The braking force is proportional to the weight of the article. An article atop braked, i.e., deactuated, roller sets 22' travels with the conveyor belt 11 in the direction of belt travel at the belt speed.

When the roller set 20 on the right in FIG. 4 is raised 52 by the underlying segment to the actuated position, the top roller 22 is elevated above the braking surface 50 and rotates as driven by the bottom roller 24 in contact with the actuated segment.

Because the actuated top roller 22 in FIG. 2 is elevated to a higher level 46 than the lower level 48 of the deactuated top roller 22', articles meant to stay in place along the conveyor run atop actuated rollers, but extending past the actuated rollers to deactuated, braked rollers, are not affected by the braked rollers because the deactuated top rollers are recessed below the level 46 of the actuated roller sets 20 and do not contact the articles. In the vicinity of lowered, deactuated roller sets 20', the conveyor belt 11 is supported between the columns of rollers from below by the stationary wearstrips 32.

Figure 5:
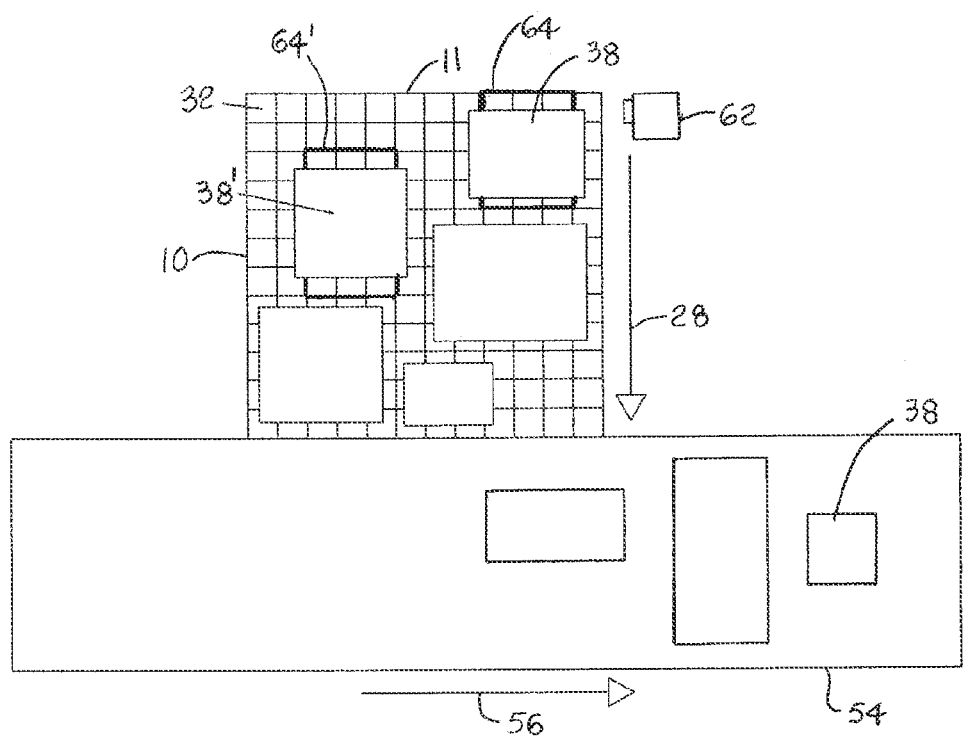
FIG. 5 is a top plan view of a conveyor system using the conveyor of FIG. 1.

One example of a conveyor system using the conveyor 10 of FIG. 1 is shown in FIG. 5. The dual-roller conveyor belt 11 advances in the direction of belt travel 28. Individual segments 32 in the array of segments are selectively actuated so as to ensure that conveyed articles 38 are singulated on a discharge conveyor 54 advancing in a discharge direction 56 perpendicular to the direction of travel 28 of the dual-roller conveyor belt 11. The segments 32 are controlled by a controller 58, illustrated in FIG. 6. The controller 58, such as a computer or a programmable logic controller, for example, receives sensor signals 60 from an optical or video sensor 62, such as one or more cameras, from a 2D or 3D laser profiler, or from any sensor capable of acquiring the layouts of the articles on the conveyor belt. The sensor 62 is positioned as shown in FIG. 5 to sense the articles 38 on the conveyor belt 11. The controller 58 includes a processor and any processor in the sensor 62 that is programmed to convert sensor data into digital images. An imaging algorithm executed by the controller 58 produces a digital image of the articles on the conveyor belt. The algorithm runs regularly to produce a succession of images of the articles showing their positions on the belt and relative to the segments. The controller 58 executes a control algorithm that groups subsets of the individual segments 32 into separate control zones 64 for the articles as a function of the digital image. The size and shape of each control zone is defined by the combined footprints of the individual segments that compose that control zone. The controller then updates the groupings as the conveyor belt advances and the articles change positions. The control algorithm changes the control zones 64 dynamically depending on which article or articles have to move. The zones move and can change shape as the articles move along the carryway. Segments are dropped from the zones as the zones move, and new segments are picked up. All the segments in a control zone 64 at any given time are either actuated (article halted) or deactuated (article advancing in the direction of belt travel 28 at the belt speed) by the controller 58. For example, if the controller determines that the article 38' has to be halted, the controller defines a control zone 64' comprising segments under the article. The controller then actuates all those segments together to actuate the corresponding roller sets in the belt 11. The article 38' atop the actuated segments in the zone 64' marks time atop the moving belt 11 to allow another article in a deactuated zone to pass by or transfer off the end of the belt 11 and onto the discharge conveyor 54. When the controller 58 determines that it's time for the article 38' to advance, the segments in the control zone 64' are deactuated to brake the roller sets under the article and allow it to advance with the belt 11.

Figure 6:
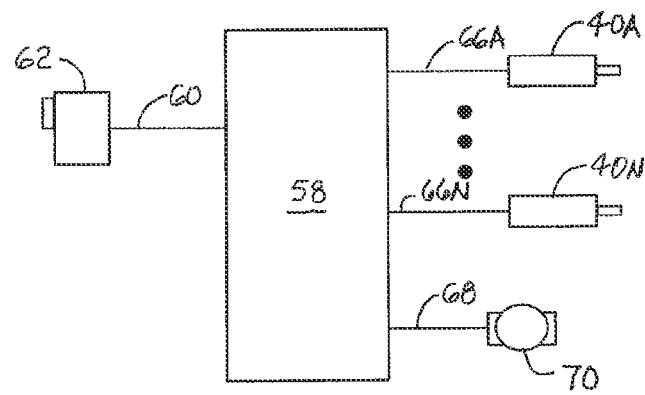
FIG. 6 is a block diagram of a control system usable with the conveyor system of FIG. 5.

As shown in FIG. 6, the controller 58 sends actuate/deactuate control signals 66A-66N to the actuators 40A-40N for each segment. The controller 58 can also be used to control belt speed with a motor control signal 68 to a belt drive motor 70. The controller can use the belt speed in conjunction with deactuating and actuating the segments for a finer control of the delivery of packages. Alternatively, the belt speed can be separately controlled or can be fixed at a known speed. If the belt speed is separately controlled and changeable, a speed-indicating signal could be sent to the controller 58 for use in controlling the segments 32.

What is claimed is:
1. A conveyor belt comprising:
  a top side and an opposite bottom side;
  multiple roller sets each including:
    a top roller at the top side for supporting conveyed articles;
    a bottom roller at the bottom side in contact with the top roller such that rotation of the bottom roller in a first direction causes rotation of the top roller in an opposite second direction;
  channels along which the roller sets are translated from a first position in which the top roller extends to a maximum level above the top side and a second position in which the top roller extends to a minimum level below the maximum level;
  a braking surface associated with each roller set and contacting the top roller when the roller set is in the second position to prevent the top roller from rotating.

2. A conveyor belt as in claim 1 wherein the braking surface lies below the top roller so that the weight of a conveyed article resting on the top roller pushes the top roller against the braking surface.

3. A conveyor belt as in claim 1 wherein the multiple rollers sets are arranged in columns of roller sets extending along the length of the conveyor belt and rows of roller sets extending across the width of the conveyor belt.

4. A conveyor belt as in claim 1 wherein the conveyor belt travels in a direction of belt travel and the top and bottom rollers rotate on axes perpendicular to the direction of belt travel.

5. A conveyor comprising:
   a conveyor belt including:
      a top side and an opposite bottom side;
      multiple roller sets each including:
         a top roller at the top side for supporting conveyed articles;
         a bottom roller at the bottom side in contact with the top roller such that rotation of the bottom roller in a first direction causes rotation of the top roller in an opposite second direction;
      wherein the roller sets are movable from a first position in which the top roller extends to a maximum level above the top side and a second position in which the top roller extends to a minimum level below the maximum level;
   an array of independently actuated segments under the bottom side of the conveyor belt, each segment including a bearing surface selectively movable into and out of contact with the bottom rollers;
   wherein the roller sets are moved into the first position with the bottom rollers rotating on the bearing surface when the bearing surface is moved into contact with the bottom rollers and wherein the roller sets are moved into the second position when the bearing surface is out of contact with the bottom rollers.

6. A conveyor as in claim 5 wherein the conveyor belt further includes a braking surface associated with each roller set and contacting the top roller when the roller set is in the second position to prevent the top roller from rotating.

7. A conveyor as in claim 6 wherein the braking surface lies below the top roller so that the weight of a conveyed article resting on the top roller pushes the top roller against the braking surface.

8. A conveyor as in claim 5 wherein the conveyor belt further includes channels along which the roller sets are moved from the first position to the second position.

9. A conveyor as in claim 5 wherein the conveyor belt travels in a direction of belt travel and the top and bottom rollers rotate on axes perpendicular to the direction of belt travel.

10. A conveyor as in claim 5 further comprising a controller and a plurality of actuators, each coupled to a respective one on the segments, wherein the controller groups one or more subsets of the segments into one or more control zones and sends control signals to the actuators to either actuate or deactuate all the segments in each control zone simultaneously.

11. A conveyor as in claim 5 further comprising a controller and an imaging system producing successive digital images of conveyed articles atop the conveyor belt, wherein the controller actuates the segments as a function of the digital images.

12. A method for conveying articles, the method comprising:
   supporting articles atop sets of vertically stacked top and bottom rollers in a conveyor belt advancing in a direction of belt travel;
   forming a carryway for the conveyor belt with an array of individually actuatable bearing surface segments under the conveyor belt;
   selectively actuating bearing surface segments to move into a first position in contact with bottom rollers to raise the top rollers to a maximum level above the top of the conveyor belt and to rotate the top rollers in a direction opposite to the direction of belt travel so that articles atop the rotating top rollers mark time;
   selectively deactuating bearing surface segments to move into a second position out of contact with the bottom rollers to the top rollers to be lowered to a minimum level below the maximum level;
   frictionally braking deactuated top rollers so that articles atop the braked top rollers advance in the direction of belt travel with the conveyor belt.

13. The method of claim 12 further comprising:
   grouping one or more subsets of the bearing surface segments into one or more control zones defined by the combined footprints of the bearing surface segments grouped in the subset;
   either actuating or deactuating all the bearing surface segments in each control zone simultaneously.

14. The method of claim 13 further comprising:
   imaging the articles to provide digital images of the articles atop the conveyor belt;
   grouping the one or more subsets of the bearing surface segments into one or more control zones defined by the combined footprints of the bearing surface segments grouped in the subset as a function of the digital images.

15. The method of claim 13 further comprising successively regrouping the bearing surface segments into control zones having other different footprints as the articles are conveyed to different positions.

* * * * *